H. LANDFRIED.
GAME TRAP DRAG.
APPLICATION FILED OCT. 11, 1916.
1,258,023.
Patented Mar. 5, 1918.
2 SHEETS—SHEET 2.
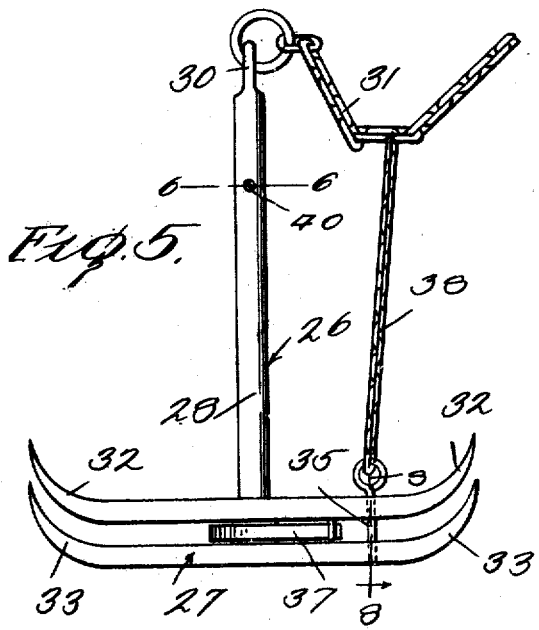
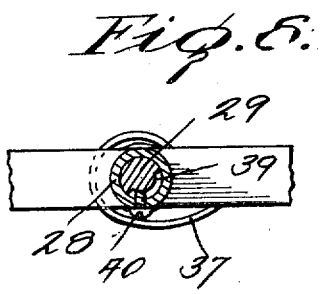
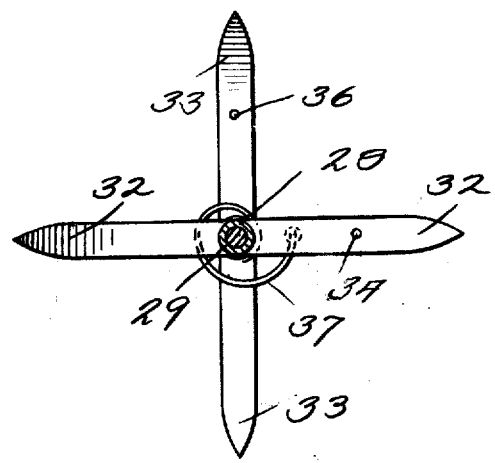
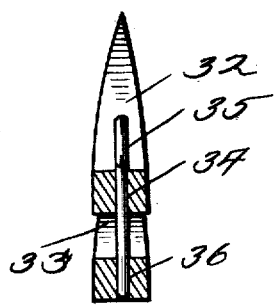
Inventor
H. Landfried

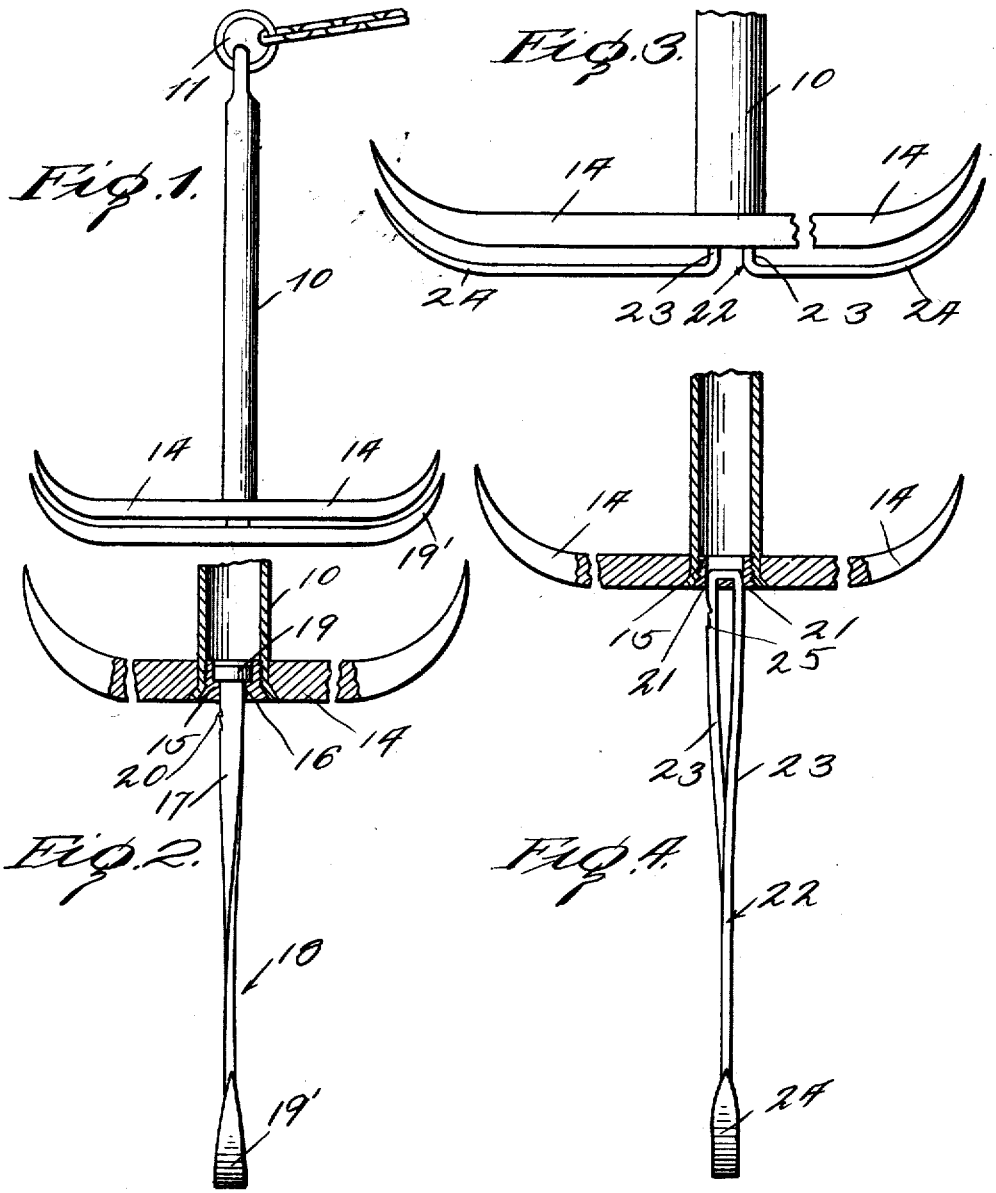

UNITED STATES PATENT OFFICE.

HOMER LANDFRIED, OF CHALLIS, IDAHO.

GAME-TRAP DRAG.

1,258,023.  Specification of Letters Patent.  Patented Mar. 5, 1918.

Application filed October 11, 1916. Serial No. 125,024.

*To all whom it may concern:*

Be it known that I, HOMER LANDFRIED, a citizen of the United States, residing at Challis, in the county of Custer, State of Idaho, have invented certain new and useful Improvements in Game-Trap Drags; and I do hereby declare the following to be a full, clear, and exact description of the invention, such as will enable others skilled in the art to which it appertains to make and use the same.

This invention relates to attachments for game traps and is directed more particularly to a trap drag of improved and novel construction.

An object of the present invention resides in the provision of a game trap drag in which the surface or ground engaging members are normally in inoperative position, but are movable into operative position to retard the progress of the trapped animal should it attempt to drag the trap from the locality in which it was set.

A further object of the invention is to provide a game trap in which the surface engaging elements are correlatively movable and are automatically operable to assume an operative position upon stress being exerted upon the drag.

With the above and other objects of similar nature in view, the invention consists in the construction, combination and arrangement of parts set forth in and falling within the scope of the appended claims.

In the drawing.

Figure 1 is a side elevation of the invention with the parts in inactive position.

Fig. 2 is a longitudinal section therethrough in active position.

Fig. 3 is a side elevation of a modified form of this invention.

Fig. 4 is a longitudinal section of what is shown in Fig. 3 with the parts in active position.

Fig. 5 is a side elevation of a further modified form of the invention.

Fig. 6 is a detail section taken on the line 6—6 of Fig. 5.

Fig. 7 is a section taken through the shank in Fig. 5, looking downwardly, with the hooks at right angles and the locking pin removed.

Fig. 8 is a detail section taken on the line 8—8 of Fig. 5.

Referring now more particularly to the accompanying drawing, there is shown in Figs. 1 and 2 the preferred embodiment of the invention. In this form the drag consists of an outer tubular shank 10 having at one end an eye 11 in which is connected one end of a chain as illustrated in Fig. 1 for connection in the usual manner with a trap.

At the opposite end of the tubular shank 10 from the eye 11 there is carried a pair of oppositely directed ground engaging hooks 14 which hooks are extended laterally at substantially right angles from the shank and have their bill portion deflected toward its forward end.

Closing the rear end of the shank 10 is a bushing 15, exteriorly threaded to engage in the tube and provided with a straight elongated slot 16 communicating with the latter. Slidably engaged through this slot is the shank 17 of a second member 18, said shank being preferably constructed from a flat metal bar which is twisted torsionally as shown and will have imparted thereto by the slot 16 a rotary motion, as it is moved longitudinally into or out of the tube 10.

Fixed to the inner end of the shank 17, is a head 19 adapted to slide freely in the shank 10 and engage the bushing 15 to limit relative movement of the shanks in one direction. At the opposite end of the shank 17 there is carried a pair of rigid ground engaging hooks 19' constructed in the manner of and deflected similarly to the hooks 14. The twisted shank 17 is provided in one of its edges with notches 20 each including a straight and an inclined shoulder as shown. Thus the shank 17 is free to move outwardly of the shank 10, the end wall of the slot 16 riding over the inclined shoulders of the notches, while accidental retrograde movement is prevented by the straight shoulder of one of the notches engaging said wall of the slot. It will be noted that the twist of the shank 17 is such as to impart thereto a quarter rotation with respect to the shank 10, so that when the shank 17 is drawn outwardly to its limit, the hooks 19' will lie at right angles to the hooks 14.

The construction in the modified form of the invention illustrated in Figs. 3 and 4 is similar to that of the preferred form with the exception that the bushing 15 in this instance is provided with a pair of spaced openings 21 in lieu of the slot 16, the rear member 22 of the drag being slidably engaged in said openings. This rear member of the drag is constructed preferably of a single length of metal, rod intermediately bent in substantially U form with the legs 23 of the U disposed in parallel relation and having their ends extended oppositely at right angles and terminating in forwardly directed ground engaging hooks 24.

The legs 23 constitute the shank of the member 22 and are torsionally twisted so that a rotary motion will be imparted to the member when the same is moved into or out of the shank 10. One of the legs 23 of the member is provided with notches 25 constructed similarly to the notches 20 in the shank 17 of the preferred form of the invention and adapted to perform a like function.

The further modified form of the invention illustrated in Figs. 5, 6, 7 and 8 while retaining certain of the principles of, is structurally dissimilar to the above described forms. Specifically the latter form consists of correlatively movable drag elements 26 and 27, the element 26 consisting of a tubular shank 28 in which the shank 29 of the element 27 is rotatably engaged.

Carried by the forward end of the shank 28 is an eye 30 in which is connected one end of a trap attaching chain 31.

Oppositely directed ground engaging hooks 32 are carried by the rear end of the shank 28, the shank 29 being similarly provided with hooks 33.

Formed transversely in one of the hooks 32 is an opening 34 in which a locking pin 35 is mounted to normally engage in a socket 36 formed in the adjacent hook 33.

The hooks 32 and 33 will thus be held against relative rotation, while to impart thereto a correlative rotary motion, there is secured to the element 26 one end of a spiral spring 37, its other end being attached to element 27.

In order to withdraw the pin 35 from the socket 36, there is connected thereto a chain 38 which in turn is connected to the drag chain 31. Thus upon stress being exerted upon the chain 31, the pin 35 will be released by reason of its connection with the chain 31, and the spring 37 thereby permitted to rotate the hooks 33 with respect to the hooks 32.

To hold the shanks 28 and 29 against longitudinal movement, and at the same time limit correlative rotation thereof in opposite directions, there is provided in the shank 29, an arcuate groove 39, a set screw 40 being screwed through the shank 28 into position to ride in said groove. The groove 39 is of a length to permit a quarter rotation of the shank 29 in the shank 28 the set screw 40 engaging opposite ends of the groove alternately to prevent further movement. The hooks in each instance form ground engaging flukes.

What I claim is:

1. A game trap drag comprising a hollow shank having flukes fixed to one end and having trap-attaching means at its opposite end, a second shank mounted within the hollow shank for limited rotation and projecting therefrom and a pair of flukes carried by the projecting portion of the second shank and movable into a plane at right angles to that of the first named flukes upon correlative movement of the shanks.

2. A game trap drag comprising a tubular shank having trap-attaching connections at one end and flukes at its opposite end, a second shank rotatably mounted within the first shank and projecting therefrom and provided with flukes at its projecting end adapted to lie in the same plane or in a plane at an angle to that of the first named flukes, potential means for urging the second named flukes into a plane different from that of the first named flukes, a latch for holding the second named flukes against the influence of said potential means and connections between the latch and the trap-attaching means for disengagement of the latch upon corresponding movement of the trap-attaching means.

In testimony whereof, I affix my signature, in the presence of two witnesses.

HOMER LANDFRIED.

Witnesses:
D. C. SMITH,
A. J. HIGGINS.